United States Patent
Dry

(10) Patent No.: US 9,452,718 B1
(45) Date of Patent: Sep. 27, 2016

(54) HEADREST ELECTRONIC DEVICE HOLDER

(71) Applicant: Ford Global Technologies, LLC, Dearborn, MI (US)

(72) Inventor: Alan George Dry, Grosse Pointe Woods, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/690,568

(22) Filed: Apr. 20, 2015

(51) Int. Cl.
*B60R 11/02* (2006.01)
*E05D 11/08* (2006.01)
*E05D 11/06* (2006.01)
*B60R 11/00* (2006.01)
*B60N 2/44* (2006.01)

(52) U.S. Cl.
CPC ........... *B60R 11/02* (2013.01); *E05D 11/06* (2013.01); *E05D 11/082* (2013.01); *B60N 2002/4405* (2013.01); *B60R 2011/0017* (2013.01); *B60R 2011/0078* (2013.01); *B60R 2011/0082* (2013.01)

(58) Field of Classification Search
CPC ........... B60R 11/0235; B60R 11/02; B60R 2011/0017; B60R 2011/0082; B60R 2011/0078; E05D 11/082; E05D 11/06; B60N 2002/4405
USPC ........................................................ 224/275
See application file for complete search history.

(56) References Cited

U.S. PATENT DOCUMENTS

| | | | |
|---|---|---|---|
| 5,687,939 A * | 11/1997 | Moscovitch | F16M 11/12 248/122.1 |
| 7,070,237 B2 | 7/2006 | Rochel | |
| 7,290,833 B2 | 11/2007 | Park et al. | |
| 7,954,894 B2 | 6/2011 | Schedivy et al. | |
| 8,109,569 B2 * | 2/2012 | Mitchell | B60R 11/0235 297/217.1 |
| 8,136,777 B2 | 3/2012 | Brawner | |
| 8,625,034 B2 | 1/2014 | Campbell et al. | |
| 8,730,413 B2 | 5/2014 | Tranchina | |
| 8,733,831 B2 * | 5/2014 | Brawner | B60R 11/02 297/188.05 |
| 8,794,700 B2 | 8/2014 | Brawner | |
| 2003/0163900 A1 * | 9/2003 | Rude | G06F 1/1616 16/337 |
| 2006/0022003 A1 * | 2/2006 | Zheng | B60R 11/0235 224/275 |
| 2012/0018471 A1 * | 1/2012 | Guillermo | B60R 11/0235 224/275 |
| 2012/0125959 A1 | 5/2012 | Kucera | |
| 2012/0312847 A1 * | 12/2012 | LaColla | B60R 11/02 224/275 |
| 2013/0200119 A1 * | 8/2013 | Ackeret | B60R 11/0235 224/275 |
| 2015/0041508 A1 * | 2/2015 | Fan | B60R 11/02 224/275 |
| 2016/0023619 A1 * | 1/2016 | Mitchell | B60R 11/0235 224/275 |

FOREIGN PATENT DOCUMENTS

WO    2005061279 A1    7/2005

* cited by examiner

*Primary Examiner* — Corey Skurdal
(74) *Attorney, Agent, or Firm* — Vichit Chea; Price Heneveld LLP

(57) ABSTRACT

An electronic device holder provides a top mounted tablet holder with a thirty degree rotational limit to its rearward swinging motion of a mounting surface. This concept has the dual benefit that the path of the electronic device holder and a viewer's upper body do not intersect during an impact event. Thus, any contact between the viewer and the tablet or device holder will be a glancing impact, as opposed to a perpendicular impact vector. As coupled to a headrest support system, the electronic device holder can move downward along the support system during impact. Further, the mounting surface of the electronic device holder is configured to move away from a potential point of impact while fully retaining an electronic device mounted thereto.

15 Claims, 8 Drawing Sheets

US 9,452,718 B1

HEADREST ELECTRONIC DEVICE HOLDER

FIELD OF THE INVENTION

The present invention generally relates to an electronic device holder assembly for mounting to a headrest of a vehicle seat, and more specifically, to an electronic device holder which is configured to mitigate impact between the holder assembly and a vehicle occupant during an impact event.

BACKGROUND OF THE INVENTION

Seatback mounted device holders for vehicles are known options frequently added to a vehicle seat for viewing by second row passengers. These device holders can raise a concern for head impact scenarios. This is particularly true when the device holder is bottom hinged and viewed above an associated seatback. During viewing by a rear seat occupant, the screen and device holder is generally in an upward viewing position. Should a front or rear impact event occur, the forces generated can cause the unit to rotate towards the occupant. Simultaneous to unit rotation, the occupant's head may be thrust forward as the upper body rotates about the vehicle seat's lap belt. The result of the two rotational motions may be that the head's motion can intersect with that of the device holder. Similarly, if the device holder is in a downward or stored position, impact forces may rotate the unit upwards to intersect with the motion of the seat occupant's upper body.

Thus, a seatback or headrest device holder is desired having rotational limits, such that motion generated from impact forces is mitigated.

SUMMARY OF THE INVENTION

One aspect of the present invention includes an electronic device holder for a headrest having an anchor collar that is coupled to the headrest and includes a hinge assembly. A mounting surface is configured to receive an electronic device and is coupled to the hinge assembly for pivoting movement via the hinge assembly. The hinge assembly includes an upward rotational limit, such that the mounting surface is limited to a pitch of no more than thirty degrees rotation from vertical.

Another aspect of the present invention includes an electronic device holder for a headrest having an anchor collar that is coupled to the headrest and includes a hinge assembly. A mounting surface is configured to receive an electronic device and is coupled to the hinge assembly for pivoting movement between a stowed position and a viewing position, and a plurality of positions therebetween. The hinge assembly includes an upward rotational limit, such that the mounting surface is rotated no more than thirty degrees from the stowed position to the viewing position.

Yet another aspect of the present invention includes an electronic device holder for a headrest having an anchor collar that is coupled to the headrest and includes a hinge assembly disposed therein. A substantially planar mounting surface is coupled to the hinge assembly for movement between first and second positions. The mounting surface is limited to a degree less than horizontal when in the second position, and more preferably, thirty degrees rotation from the first position to the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
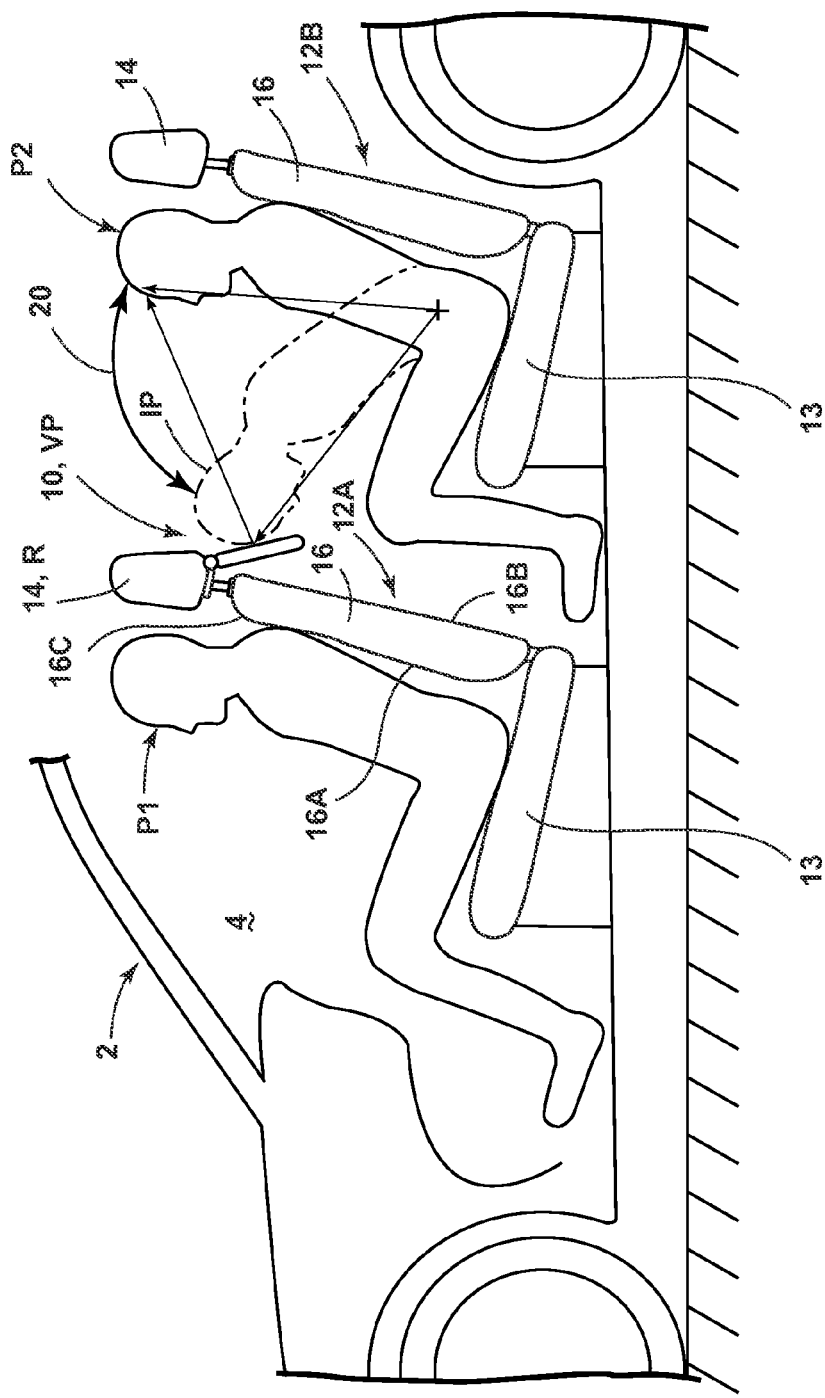
FIG. 1 is a fragmentary side elevational view of a vehicle showing first and second row passengers seated in the vehicle with a device holder coupled to a front seat according to one embodiment of the present concept.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates an electronic device holder as mounted to a front seat 12A. The front seat 12A includes a seat portion 13 which is adjustably or pivotally coupled to a seatback 16. The seatback 16 includes a front side 16A, a rear side 16B and an upper portion 16C. A headrest assembly 14, or head restraint assembly, is adjustably coupled to the seatback 16 at the upper portion 16C thereof. A rear seat 12B is also shown in FIG. 1 having similar components as noted above with reference to front seat 12A. The electronic device holder 10 is hingedly or pivotally coupled to the headrest assembly 14, as further described below, and is configured to support and retain an electronic device therein. The electronic device to be supported by the electronic device holder 10 is generally a portable electronic device, such as a tablet, a mobile phone, a DVD player, or other like electronic device. For the purposes of this disclosure, the electronic device to be supported in the electronic device holder 10 will be described herein as a tablet, although one of ordinary skill in the art will appreciate that other such electronic devices can be retained in the electronic device holder 10.

With further reference to FIG. 1, the front and rear seats 12A, 12B are shown disposed in a vehicle interior 4 of a vehicle 2, with passengers P1 and P2 seated in the front and rear seats 12A, 12B, respectively. As further shown in FIG. 1, the headrest 14 of front seat 12A is shown in a raised position R. As coupled to the headrest 14, the electronic device holder 10 is shown pivoted to an outward or second viewing position VP. As further shown in FIG. 1, relative movement of the rear passenger P2 is indicated along a pivoting path 20, which is drawn to represent contemplated movement of the upper portion of rear passenger P2 during a front end or rear end impact event. Thus, as shown in FIG. 1, the rear passenger P2 is shown in a seated position, as well as an impact position IP, shown in phantom, wherein the rear passenger P2 makes contact with the electronic device holder 10 in a glancing manner with the electronic device holder 10 in the outward viewing position VP.

Figure 2:
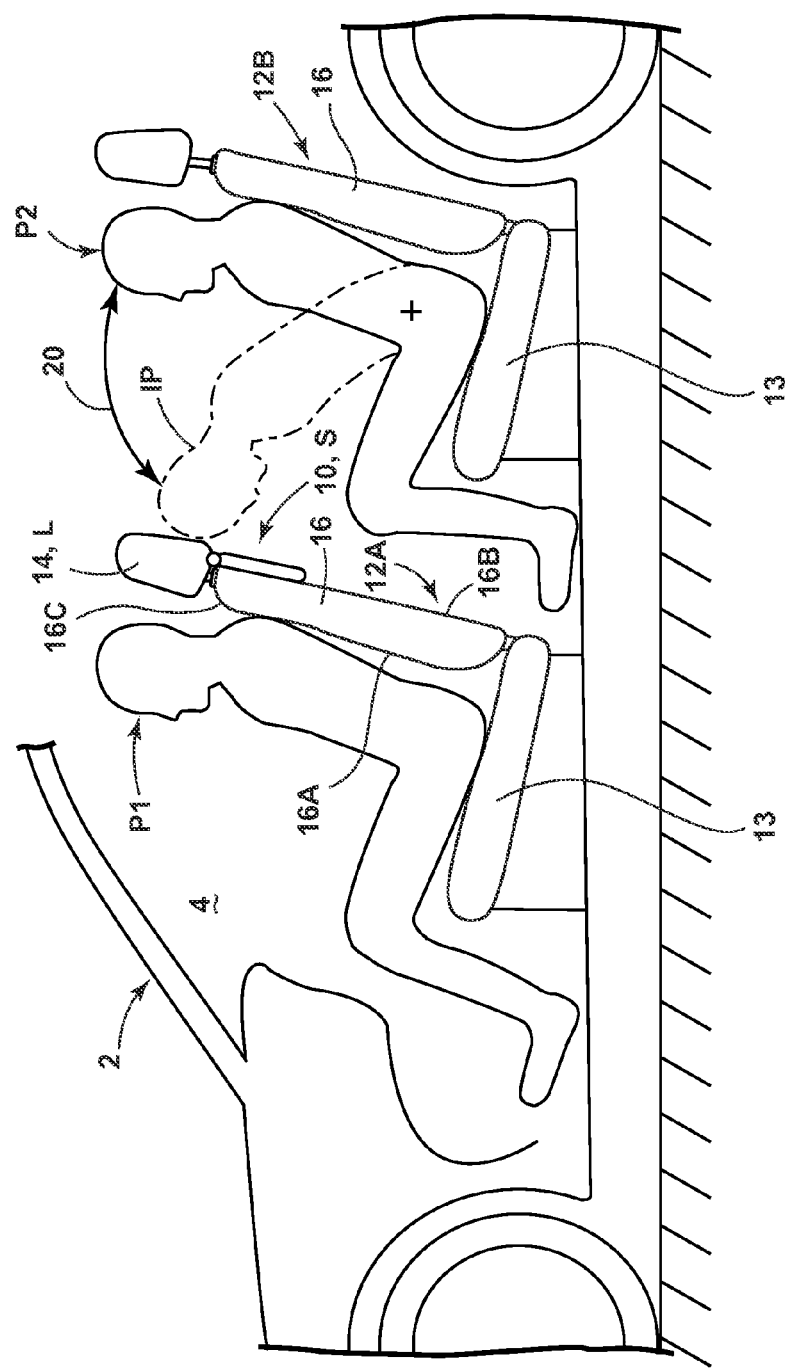
FIG. 2 is a fragmentary side elevational view of the vehicle of FIG. 1 showing relative movement of an upper portion of the second row passenger.

Referring now to FIG. 2, the headrest 14 of front seat 12A is shown in a lowered position L, while the electronic device holder 10 is shown in a stowed position S. In the lowered position L, the headrest 14 is moved vertically towards the upper portion 16C of seatback 16 of front seat 12A, as compared to the raised position R shown in FIG. 1. In the stowed position S, the electronic device holder 10 is adjacent to or abutting the rear side 16B of the seatback 16 of front seat 12A. As represented in FIG. 2, the impact position IP of rear passenger P2 along path 20 shows the rear passenger P2 making contact with a rear side of the headrest 14 of front seat 12A. The electronic device holder 10 of the present invention is configured to limit outward rotation to a degree or pitch that is less than horizontal, or more preferably, thirty degrees from vertical or from the stowed position S, as further described below. In FIGS. 1 and 2, the electronic device holder 10 is shown coupled to the front seat 12A at headrest 14. However, it is contemplated that the electronic device holder 10 of the present invention can be mounted to any vehicle seat, such as rear seat 12B, for viewing by a third row occupant. Further, the electronic device holder 10 of the present invention can be mounted on the driver's side or the passenger's side of the vehicle interior 4.

Figure 3:
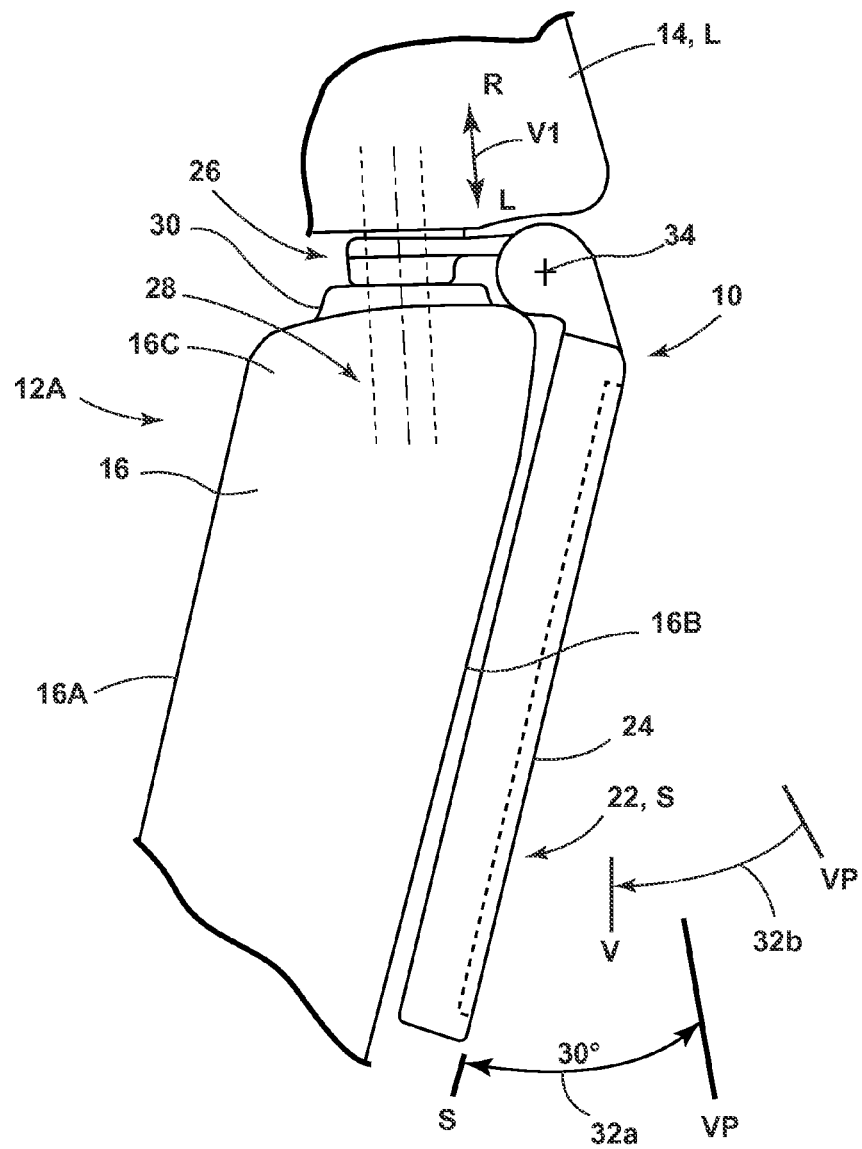
FIG. 3 is a side elevational view of a vehicle seatback and headrest having a device holder coupled thereto in a stowed position according to another embodiment of the present concept.

Referring now to FIG. 3, the headrest 14 of front seat 12A is shown in the lowered position L, while the electronic device holder 10 is shown in a stowed position S. As used throughout this disclosure, the stowed position S may also be referred to as the first position, wherein a mounting surface 22 of the electronic device holder is rotated towards the seatback 16, such that the mounting surface 22 either abuts or is disposed adjacent to the seatback 16. As shown in FIG. 3, the mounting surface 22 of the electronic device holder can be rotated outward towards a viewing position VP or second position, as used herein, for viewing an electronic device by a second row passenger. The mounting surface 22 is configured to hold or retain an electronic device in a mounting cavity 24 by any means generally known in the art. Generally, the mounting surface 22 will retain the electronic device with an outwardly facing display screen for viewing by a vehicle occupant. As further shown in FIG. 3, the electronic device holder 10 includes an anchor collar 26 which is coupled to a telescoping support system 28 of the headrest 14. The telescoping support system 28 is configured to move the headrest 14 between the lowered position L (FIG. 3) and the raised position R (FIG. 1), and any position therebetween, along a path as indicated by arrow V1. With the headrest 14 in the lowered position L, the anchor collar 26 abuts a plastic bezel 30 disposed on the upper portion 16C of the seatback 16. As further shown in FIG. 3, the mounting surface 22 is a substantially planar surface configured to rotate between the stowed or first position S and the viewing or second position VP, along a path as indicated by arrow 32a. Also shown in FIG. 3, the mounting surface 22 can be configured, such that the viewing VP is thirty degrees from vertical V as indicated by arrow 32b. The mounting surface 22 pivots from the anchor collar 26 at pivot point 34 via a hinge assembly, as further described below.

Figure 4:
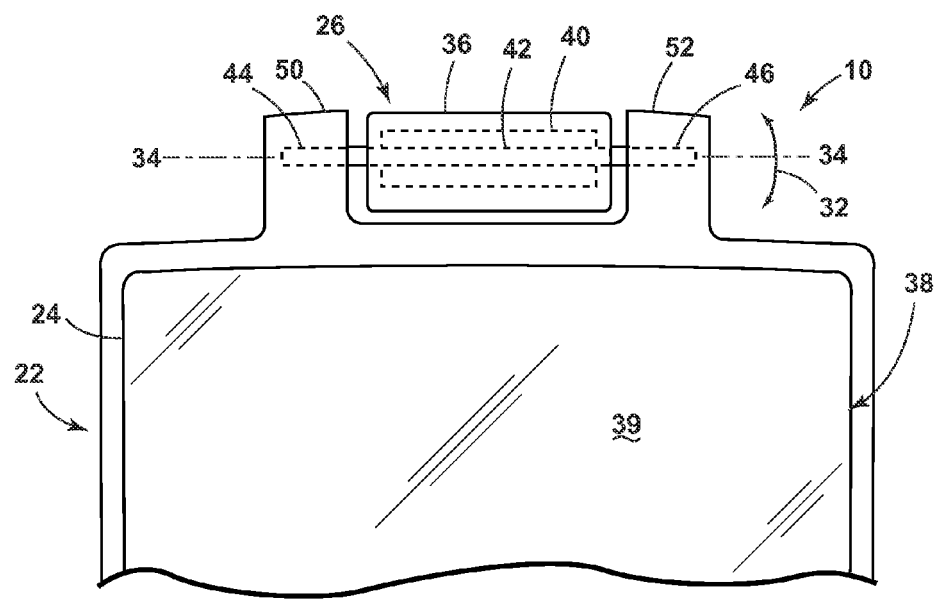
FIG. 4 is a fragmentary rear plan view of a device holder according to another embodiment of the present concept.

Referring now to FIG. 4, the electronic device holder 10 is shown having a mounting portion 36 of anchor collar 26. A hinge assembly 40 is shown disposed within the mounting portion 36 of anchor collar 26. The hinge assembly 40 is contemplated to be a friction hinge having constant torque for rotation of the mounting surface 22 relative to the anchor collar 26. The hinge assembly 40 includes a dual sided shaft 42 having grooved or splined first and second ends 44, 46 extending outwardly from the hinge assembly 40 at opposite ends thereof. The splined first and second ends 44, 46 are coupled to first and second trunnions 50, 52 which extend outwardly from the mounting surface 22. It is contemplated that the first and second trunnions 50, 52, are polymeric members that are overmolded to the splined first and second ends 44, 46 of the hinge assembly 40 to securely couple the mounting surface 22 to the hinge assembly 40. As used herein, the term "overmolding" or "overmolded" refers to a part being surrounded and coupled to another using a polymeric molding technique, such as insert molding, double shot molding, or co-injection molding techniques. The first and second trunnions 50, 52 are shown in FIG. 4 as box trunnions, but can take any other shape as dictated by design. As further shown in FIG. 4, an electronic device 38 is shown mounted to the mounting cavity 24 of mounting surface 22, wherein the electronic device 38 includes an outwardly facing display screen 39. The mounting surface 22 is configured to rotate at pivot point 34 via the hinge assembly 40 as indicate by arrow 32.

Figure 5:
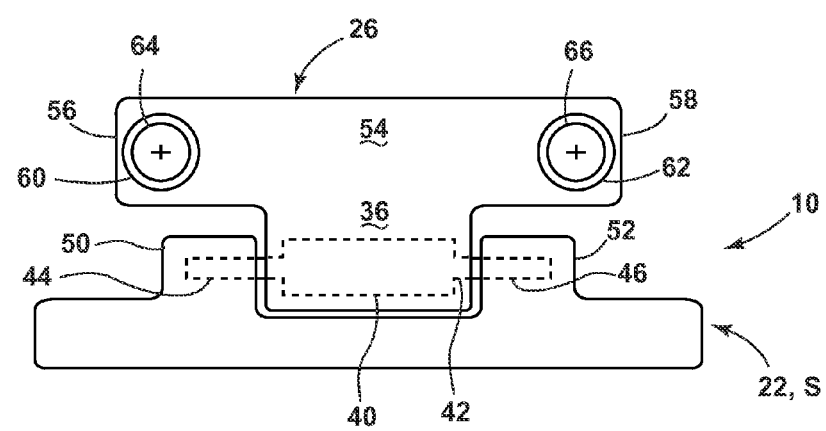
FIG. 5 is a top plan view of a device holder according to another embodiment of the present concept.

Referring now to FIG. 5, the anchor collar 26 is shown having an anchor portion 54 with first and second ends 56, 58. Disposed at the first and second ends 56, 58 are mounting apertures 60, 62 which are configured to mount the anchor collar 26 to the telescoping support system 28 (FIG. 3) of the headrest 14. Thus, as shown in FIG. 5, the anchor collar 26 is configured to support the electronic device holder 10 via one or more support posts used to support the headrest 14, wherein the headrest 14 is commonly supported by dual support posts, indicated by reference numerals 64, 66 in FIG. 5. The mounting portion 36 of the anchor collar 26 is shown extending outward in a car-rearward direction from the anchor portion 54, such that the mounting surface 22 is extended out and over the rear side 16B (FIG. 3) of the seatback 16 for viewing by a second or third row passenger. To mount the anchor collar 26 to the telescoping support system 28 (FIG. 3) of the headrest 14, it is contemplated that the headrest 14 is removed from the upper portion 16C of the seatback 16 and support posts 64, 66 are inserted into the mounting apertures 60, 62 of the anchor portion 54 of anchor collar 26 and then further mounted to the upper portion 16C of the seatback 16, as shown in FIG. 3. It is contemplated that the hinge assembly 40 can be molded into the anchor collar 26 at mounting portion 36. Further, the anchor collar 26 can be a two-part member configured to clamp around the hinge assembly 40 in a clam shell style arrangement.

Figure 6:
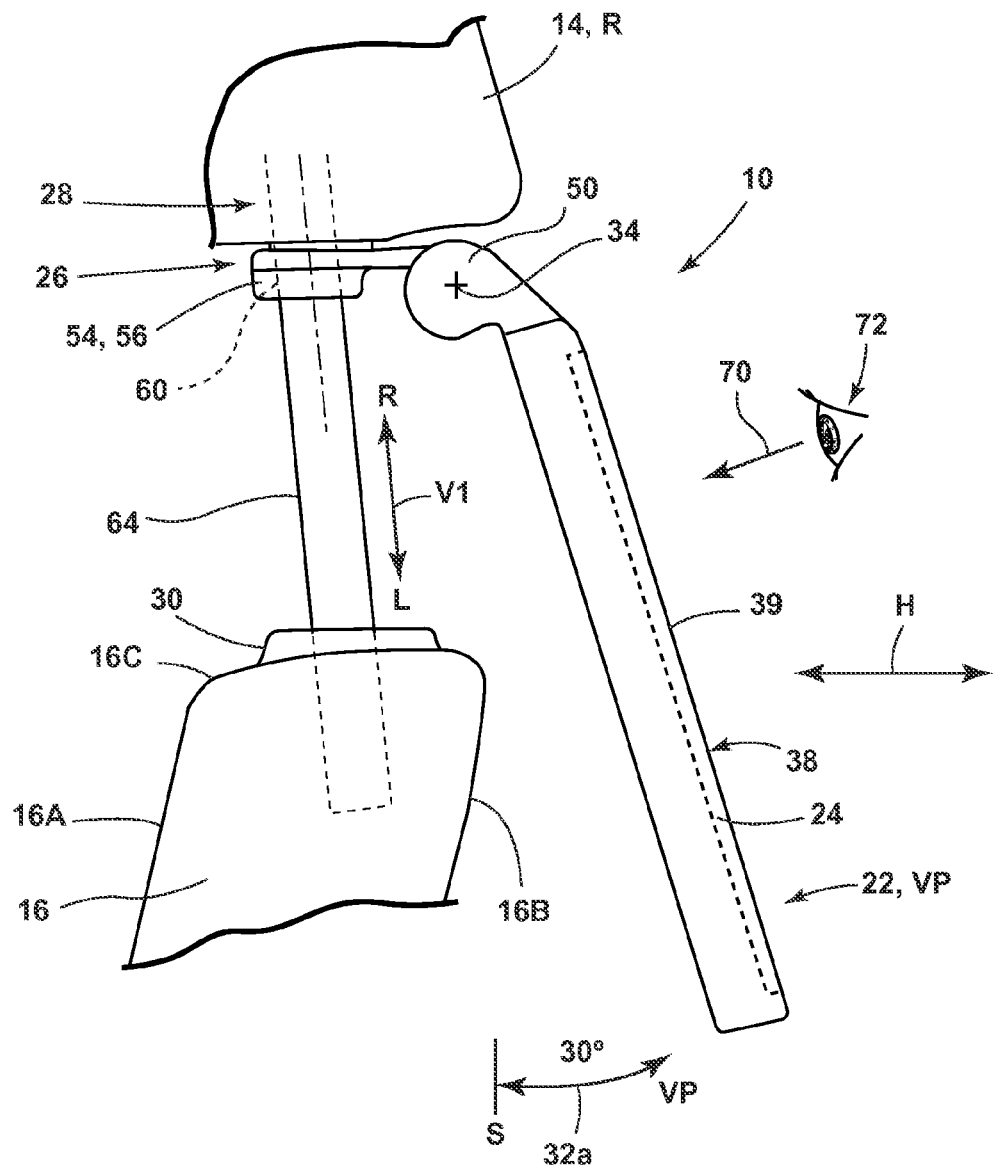
FIG. 6 is a side elevational view of a vehicle seatback and headrest having a device holder coupled thereto according to another embodiment of the present concept.

Referring now to FIG. 6, the headrest 14 is shown in the raised position R along the path as indicated by arrow V1. The anchor collar 26 is shown coupled to the telescoping support system 28 at support posts 64, wherein first side 56 of anchor portion 54 is mounted to support post 64 at mounting aperture 60. Thus, as shown in FIG. 6, the electronic device holder 10 can move vertically with the headrest 14 in the direction as indicated by arrow V1 when the anchor collar 26 is mounted to the telescoping support system 28 and coupled to the headrest 14. In this way, the electronic device holder 10 can be raised with the headrest 14 and rotated at pivot point 34 from a stowed position S to a viewing position VP which is shown in FIG. 6 as being thirty degrees from the stowed position S along a path as indicated by arrow 32a. In FIG. 6 the line of sight 70 of a viewer 72 is shown, wherein the display screen 39 of the electronic device 38 retained within the electronic device holder 10 is substantially perpendicular to the viewer's line of sight 70. The movement of the mounting surface 22 of the electronic device holder 10 is contemplated to accommodate various viewers, from child to adult. As noted above, the rotational range of the hinge assembly 40 can be limited to thirty degrees from the stowed position S, or thirty degrees from vertical V (FIG. 3), such that the mounting surface 22 of the electronic device holder 10 is located at an angle less than horizontal H, to provide an electronic device holder 10 configured to avoid a direct perpendicular impact by a viewer of the electronic device holder 10.

Thus, as shown in FIG. 6, the electronic device holder 10 can elevate with the headrest 14 and tilt to accommodate the viewing angle, or line of sight 70, of viewer 72. The anchor collar 26 can be attached to the headrest 14, such that the electronic device holder 10 moves with the headrest 14 along the path indicated by arrow V1 via the telescoping support system 28. The telescoping support system 28 can be a manually controlled system, or can be an electronically powered system. With the anchor collar 26 attached to the headrest 14, the electronic device holder 10 can be used to power or charge the electronic device 38, or tablet, from the vehicle's power supply as further described below with reference to FIGS. 7 and 8.

Figure 7:
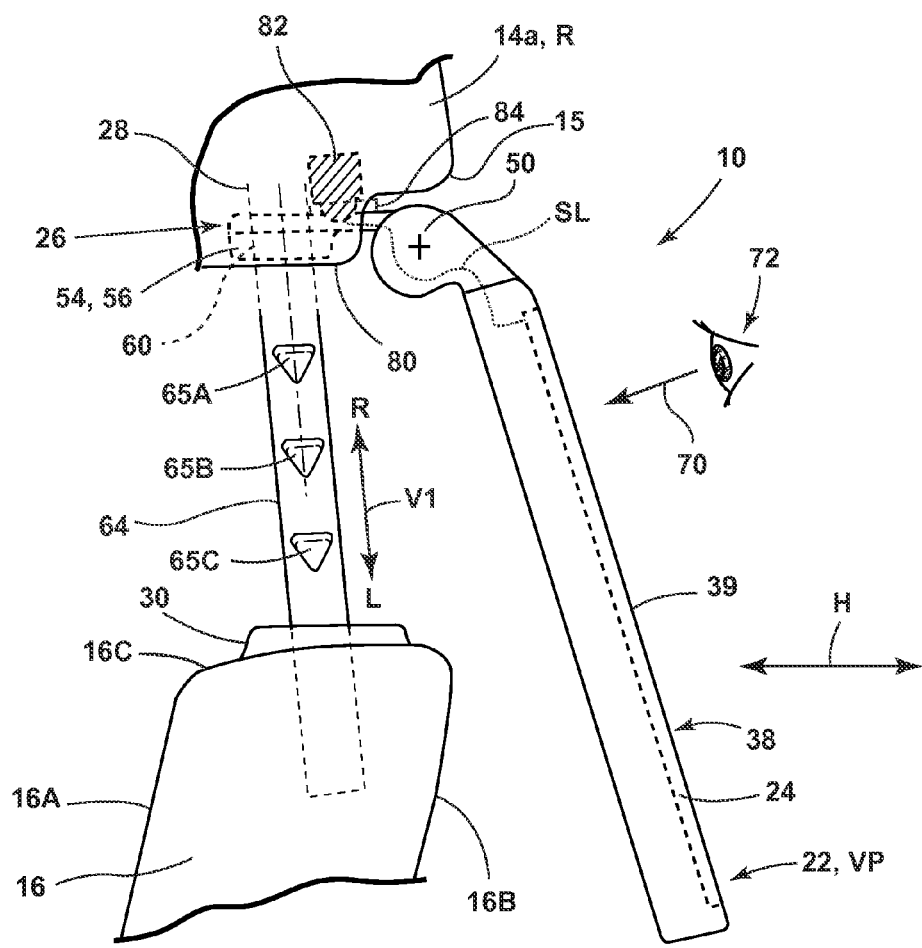
FIG. 7 is a side elevational view of a vehicle seatback and headrest having a device holder coupled thereto in a raised viewing position according to another embodiment of the present concept.

Referring now to FIG. 7, power supply and data transfer to the tablet 38 can be drawn directly from the headrest 14 and supply wires can be hidden as they enter the electronic device holder 10 beneath the hinge assembly 40. In FIG. 7, another embodiment of the headrest 14a is shown having a notched-out portion 15 disposed at a base portion 80 of the headrest 14a. The headrest 14a includes an electrical connector 82 configured to supply power and facilitate data transfer from the tablet 38 through the electronic device holder 10.

Figure 8:
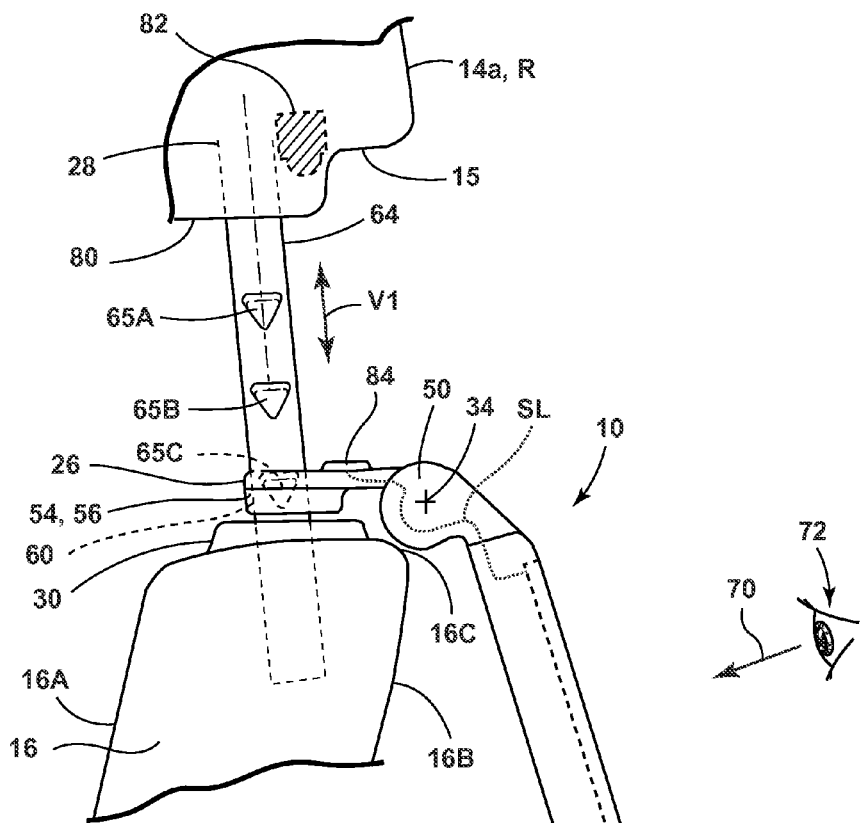
FIG. 8 is a side elevational view of a vehicle seatback, headrest having and device holder of FIG. 7 with the device holder shown in a lowered viewing position.

Thus, as shown in FIG. 7, the electronic device holder 10 is shown in an upper most position with the anchor collar 26 received in the base portion 80 of headrest 14a. As received therein, the anchor collar 26 couples to and interfaces with electrical connector 82 of the headrest 14a in a concealed manner. Electrical power and data transfer from the tablet 38 is facilitated via supply lines SL which are substantially concealed and coupled to an electrical connector 84 disposed on the anchor collar 26, as best shown in FIG. 8. Thus, the electrical connector 82 of the headrest 14a and the electrical connector 84 of the electronic device holder 10 are reciprocal electrical connectors configured to connect the tablet 38 with the vehicles power supply. In FIG. 7, the headrest 14a is shown in the raised position R, with the electronic device holder 10 in the raised and connected position. In this position, it is contemplated that the electronic device holder 10 will move vertically along the path as indicated by arrow V1 with the headrest 14a as the headrest 14a is moved via the telescoping support system 28. Further, it is contemplated that the anchor collar 26 can be unplugged from the base portion 80 of the headrest 14a by moving the anchor collar 26 downward in the direction as indicated by arrow V1. This downward movement will disconnect the electrical connectors 82, 84, and then the electronic device holder 10 can be supported at any position along the length of support post 64 for optimized viewing by the viewer 72. As shown in FIG. 7, the support post 64 includes a plurality of detent features 65A, 65B, and 65C disposed along the length thereof. It is contemplated that the anchor collar 26 can accommodate the positioning of the electronic device holder 10 at any one of the detent features 65A-65C along the support post 64.

With reference to FIG. 8, the headrest 14a is shown in the raised position R with the electronic device holder 10 lowered along support post 64, such that the anchor collar 26 is engaged with detent feature 65C. As lowered along support post 64, the electronic device holder 10 is disconnected from the power supply of the vehicle as electrical connector 82 is now disconnected from electrical connector 84 due to the movement of the anchor collar 26 away from the base portion 80 of the headrest 14.

Figure 9:
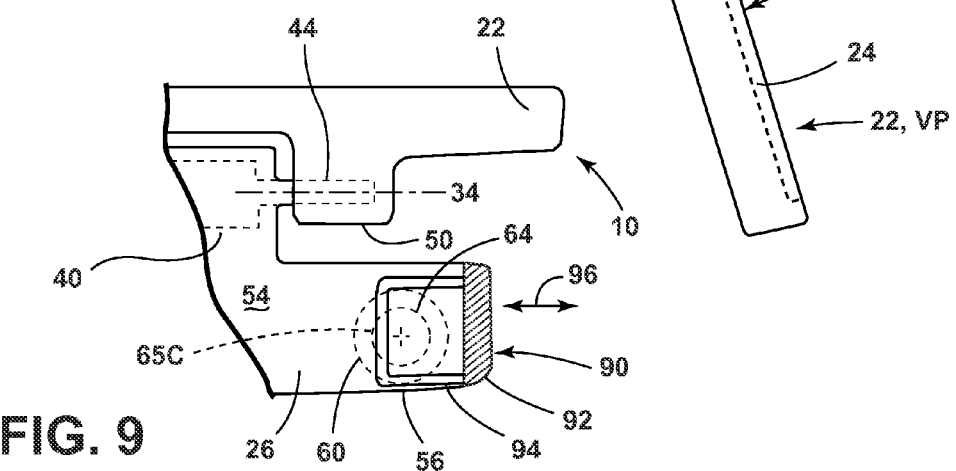
FIG. 9 is a fragmentary top plan view of a device holder according to another embodiment of the present concept.

Referring now to FIG. 9, the electronic device holder 10 is shown with the anchor collar 26 coupled to support post 64 at detent feature 65C via a lock mechanism 90 which includes a spring-biased push button actuator 92 and a U-shaped lock bar 94. The U-shaped lock bar 94 is configured to couple to one of the detent features of support post 64, such as detent feature 65C as shown in FIG. 9. The U-shaped lock bar 94 is coupled to the push button actuator 92 disposed on first end 56 of the anchor portion 54 of the anchor collar 26. The lock mechanism 90 is configured to move laterally in the direction as indicated by arrow 96 to release the U-shaped lock bar 94 from the detent feature 65C for moving the electronic device holder 10 up and down the support post 64 in the direction as indicated by arrow V1 in FIG. 8. It is contemplated that both the first and second ends 56, 58 (FIG. 5) of the anchor collar 26 can have a lock mechanism, such as lock mechanism 90 shown in FIG. 9, for uniformly and securely attaching the electronic device holder 10 in a vertical position along the support posts 64, 66 (FIG. 5) of the telescoping support system 28 of the headrest 14a.

Figure 10A:
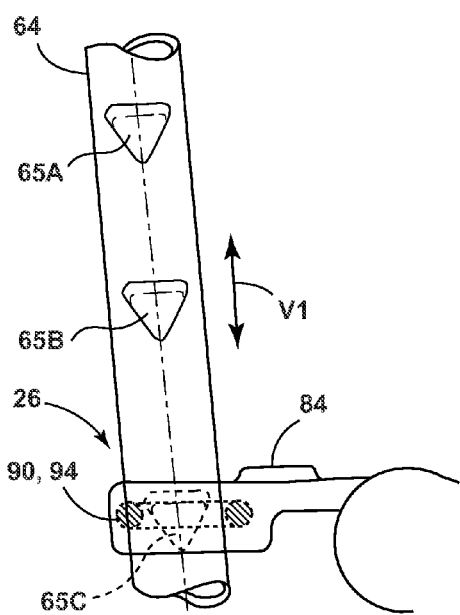
FIG. 10A is a side elevational view of an adjustable coupling assembly between a headrest support post and an anchor collar for use with the device holder of the present concept.

Referring now to FIG. 10A, the lock mechanism 90 is shown as engaged with detent feature 65C of support post 64 to support the electronic device holder 10 along the length of the support post 64. Thus, as shown in FIG. 10A, the anchor collar 26 is shown having the lock bar 94 of lock mechanism 90 engaged with detent 65C of support post 64. While the embodiment shown in FIG. 10A includes three detent features 65A-65C, it is contemplated that any number of detent features can be disposed along the length of the support post 64 for securing the electronic device holder 10 thereto at various heights.

Figure 10B:
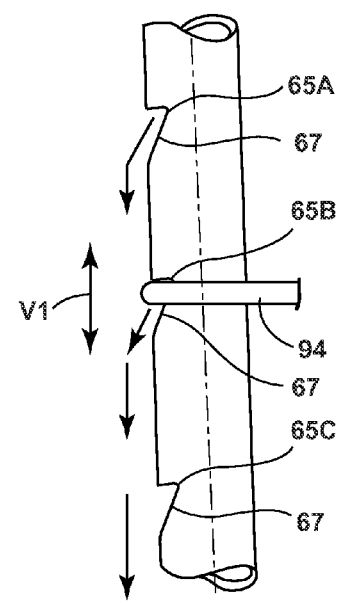
FIG. 10B is a side elevational view of a locking bar configured to slip down a headrest support post on impact.

Referring now to FIG. 10B, the lock bar 94 of lock mechanism 90 is shown engaged with detent feature 65B. As further shown in FIG. 10B, the detent features 65A-65C each include a downwardly slopped surface 67, which is contemplated to facilitate the release of the lock mechanism 90 by overcoming a spring-bias of the lock mechanism 90 to allow the electronic device holder 10 to move downward towards a lowermost position, as shown in FIG. 8, when a downward impact is realized on the electronic device holder 10. In this way, should a second row passenger contact the electronic device holder 10 during an impact event, the electronic device holder 10 is contemplated to mitigate such an impact force by moving downward along the support posts 64, 66 of the headrest 14. The downwardly slopped surfaces 67 allow the anchor collar 26 of the electronic device holder 10 to slide down the support posts 64 during impact, thereby releasing the lock bar 94 from a detent feature. Under normal conditions, during a non-impact event, the lock bar 94 will securely hold the electronic device holder 10 in one of the detent features 65A-65C of support post 64. Having this downward release feature provides a mitigating impact feature for the electronic device holder 10 of the present invention. Further, the limited rotational movement of the mounting surface 22 of the electronic device holder 10 provides for an electronic device holder that does not contact a viewer in a perpendicular or direct impact manner, but rather in an glancing manner, under which the mounting surface 22 of the electronic device holder 10 is configured to rotate towards the stowed position S, as shown in FIG. 3 and move downward along support posts 64, 66.

The limited rotation of the electronic device holder 10 is contemplated to be factory set by the hinge assembly 40 having a rotational limit set therein. Further, it is contemplated that a free-range hinge assembly 40 can be used with the electronic device holder 10, wherein it is contemplated that a stop feature can be implemented between the anchor collar 26 and the mounting surface 22, possibly at the trunnions 50, 52 and mounting portion 36 of the anchor collar 26, to limit the rotational movement of the mounting surface 22 in use. As noted above, the rotation of the mounting surface 22 can be limited thirty degrees from vertical, and/or thirty degrees from the stowed positions to the viewing position VP. In this way, the electronic device holder 10 of the present invention provides for customized vertical adjustment along the support posts 64, 66 of a headrest support system 28, as well as a customized viewing angle via the rotation of the mounting surface 22 at the hinge assembly 40.

The electronic device holder 10 of the present invention provides an effective hands-free viewing option for a passenger by securely holding an electrical device using an extremely low mass design having no brackets mounted inside the seat and no steel structure within the anchor collar 26 or mounting surface 22, except for the shaft 42 of the hinge assembly 40 which is contemplated to be made from steel. As noted above, the anchor collar 26 can be a plastic over molding structure of the hinge assembly 40, while the mounting surface 22 can be an over molding structure onto the ends 44, 46 of the hinge assembly 40. While the electronic device holder 10 does mount higher on the vehicle seat 12A as compared to bottom hinged units, its greatly reduced mass makes the present holder more stable from a vibration stand point. Further since there is no internal seat bracket necessary to bolster the coupling of the electronic device holder 10 to the vehicle seat 12A, there remains adequate space for a tuned vibration damper and other equipment.

It will be appreciated by those skilled in the art that although the invention has been described by way of example with reference to one or more embodiments it is not limited to the disclosed embodiments and that alternative embodiments could be constructed without departing from the scope of the invention as defined by the appended claims. It will further be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electronic device holder for a headrest, comprising:
an anchor collar having an anchor portion with one or more mounting apertures coupled to one or more support posts of the headrest by one or more lock mechanisms, wherein the one or more lock mechanisms include a release feature configured to release the one or more lock mechanisms from the one or more support posts of the headrest allowing for downward movement of the electronic device holder along the one or more support posts of the headrest when a force is realized on the electronic device holder by a vehicle occupant during an impact event;

a hinge assembly coupled to the anchor collar; and a mounting surface configured to receive an electronic device and coupled to the hinge assembly for pivoting movement therewith, wherein the hinge assembly includes an upward rotational limit, such that the mounting surface is limited to a pitch of no more than thirty degrees rotation from vertical.

2. The electronic device holder of claim 1, wherein the hinge assembly includes a friction hinge.

3. The electronic device holder of claim 2, wherein the friction hinge includes a shaft having first and second ends.

4. The electronic device holder of claim 3, wherein the mounting surface includes first and second trunnions coupled to the first and second ends of the shaft respectively.

5. The electronic device holder of claim 4, wherein the first and second trunnions are overmolded to the first and second ends of the shaft respectively.

6. The electronic device holder of claim 1, wherein the anchor collar is overmolded to the hinge assembly.

7. The electronic device holder of claim 1, wherein the anchor collar includes an electrical connector configured to couple to an electrical connector disposed on the headrest for powering an electronic device.

8. An electronic device holder for a headrest, comprising:

an anchor collar having one or more mounting apertures for mounting to one or more support posts of the headrest, the one or more support posts having one or more detent features disposed along a length thereof, wherein the anchor collar further includes one or more lock mechanisms configured to engage one or more of the one or more detent features;

a hinge assembly coupled to the anchor collar;

a mounting surface configured to receive an electronic device and coupled to the hinge assembly for pivoting movement between a stowed position and viewing position, wherein the mounting surface includes an upward rotational limit, such that the viewing position is no more than thirty degrees rotation from the stowed position; and wherein a release feature is configured to release the one or more lock mechanisms from the one or more detent features of the one or more support posts of the headrest allowing for downward movement of the electronic device holder along the one or more support posts of the headrest when a force is realized on the electronic device holder by a vehicle occupant during an impact event.

9. The electronic device holder of claim 8, wherein the one or more lock mechanisms include a lock bar and a button actuator, the lock bar configured to engage one of the one or more detent features of the one or more support posts, wherein the button actuator is configured to release the lock bar from the one or more detent features.

10. The electronic device holder of claim 8, wherein the release feature includes a downwardly slopped surface disposed on the one or more detent features.

11. An electronic device holder for a headrest, comprising:

an anchor collar having one or more mounting apertures disposed thereon, wherein one or more support posts of the headrest are received through the one or more mounting apertures of the anchor collar and retained in a first vertical position along a length of the one or more support posts by one or more lock mechanisms, wherein the one or more lock mechanisms include a release feature configured to release the one or more lock mechanisms from the one or more support posts of the headrest allowing for downward movement of the electronic device holder along the length of the one or more support posts of the headrest from the first vertical position to a second vertical position that is lower than the first vertical position when a force is realized on the electronic device holder by a vehicle occupant during an impact event.

12. The electronic device holder of claim 11, wherein the anchor collar includes an electrical connector configured to couple to an electrical connector disposed on the headrest for powering an electronic device.

13. The electronic device holder of claim 11, wherein the one or more support posts of the headrest include one or more detent features disposed along the length thereof.

14. The electronic device holder of claim 13, wherein the one or more lock mechanisms include a lock bar and a button actuator, the lock bar configured to engage one of the one or more detent features of the one or more support posts, wherein the button actuator is configured to release the lock bar from the one or more detent features.

15. The electronic device holder of claim 13, wherein the release feature includes a downwardly slopped surface disposed on the one or more detent features.

* * * * *